(12) United States Patent  
Psaltis et al.

(10) Patent No.: US 6,987,907 B2  
(45) Date of Patent: Jan. 17, 2006

(54) TUNABLE HOLOGRAPHIC DROP FILTER WITH QUASI PHASE-CONJUGATE FIBER COUPLING

(75) Inventors: Demetri Psaltis, Pasadena, CA (US); Christophe Moser, Pasadena, CA (US); Greg Steckman, Pasadena, CA (US); Karsten Buse, Bouri (DE); Ingo Nee, Parenburg (DE); Joerg Hukriede, Lengerich (DE); Joseph W. Goodman, Los Altos, CA (US)

(73) Assignee: California Institute of Technology, Pasadena, CA (US)

( * ) Notice: Subject to any disclaimer, the term of this patent is extended or adjusted under 35 U.S.C. 154(b) by 225 days.

(21) Appl. No.: 10/006,933

(22) Filed: Dec. 4, 2001

(65) Prior Publication Data

US 2002/0097458 A1   Jul. 25, 2002

Related U.S. Application Data

(60) Provisional application No. 60/251,245, filed on Dec. 4, 2000.

(51) Int. Cl.  
*G02B 6/26* (2006.01)

(52) U.S. Cl. .............................. 385/33; 385/31; 385/15; 359/34

(58) Field of Classification Search .................. 385/31, 385/33, 39, 47, 15, 16, 18; 359/15, 19, 34  
See application file for complete search history.

(56) References Cited

U.S. PATENT DOCUMENTS

| 5,606,439 | A | | 2/1997 | Wu | |
|---|---|---|---|---|---|
| 5,937,115 | A | * | 8/1999 | Domash | 385/16 |
| 6,246,818 | B1 | * | 6/2001 | Fukushima | 385/47 |
| 6,362,904 | B1 | * | 3/2002 | Cormack | 398/82 |
| 6,587,608 | B2 | * | 7/2003 | Cormack | 385/16 |
| 2001/0028483 | A1 | | 10/2001 | Buse | |

OTHER PUBLICATIONS

Holographic optical tunable filter using LC-SLM in photorefractive crystal, An, et al.; Ieee, Cleo Pacific Rim 1999, pp. 819-820.

* cited by examiner

*Primary Examiner*—Juliana Kang  
(74) *Attorney, Agent, or Firm*—Brown Raysman Millstein Felder & Steiner LLP

(57) ABSTRACT

The present invention is a method and apparatus for a rotating, tunable, holographic drop filter connected to a fiber optic source. The filter uses a quasi phase-conjugate optical system for a drop-channel fiber coupling and WDM channels which are introduced to the system. The light from these channels is collimated and passed through a volume phase holographic material so that only one WDM channel is diffracted and the rest pass through the holographic material unaffected. A quasi phase-conjugate diffracted beam is generated by the optical system to reflect the diffracted channel back towards the holographic material. The reflected light is Bragg matched to the holographic material so that it is re-diffracted along a path identical to the original incident light beam. A free-space circulator may be used to direct the diffracted beam to a fiber optic collimator, which is different from the fiber optic collimator of the incident light beam.

12 Claims, 2 Drawing Sheets

TUNABLE HOLOGRAPHIC DROP FILTER WITH QUASI PHASE-CONJUGATE FIBER COUPLING

RELATED APPLICATION

This application claims the benefit of U.S. Non-Provisional application Ser. No. 09/823,173, filed on Mar. 29, 2001 entitled "Tunable Holographic Filter" and U.S. Provisional Application No. 60/251,245, filed on Dec. 4, 2000, the disclosures of which are hereby incorporated by reference.

BACKGROUND OF THE INVENTION

1. Field of the Invention

The present invention relates to the field of fiber optics, and in particular to a method and an apparatus for a tunable holographic drop filter with a quasi phase-conjugate fiber coupling.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Digital and analog information is often communicated using optical fibers. In some schemes, many signals, each with its own optical wavelength, are communicated on the same optical fiber. At some point, it is necessary to extract a signal (i.e. a particular optical wavelength) from the optical fiber, and this is accomplished with a drop filter. A problem with prior art drop filters is that they are limited to a single fixed optical wavelength. This problem can be understood by a review of optical signal transmission schemes.

Optical Signal Transmission Scheme

With the increase of data transfer due to the popularity and ease of use of the Internet, there is a need to increase the volume (commonly termed bandwidth) of data that can be transmitted across a network of computing devices. Initially, optical fiber networks carried only a single signal at a single wavelength. A scheme using wavelength division multiplexing (WDM) has significantly enabled increases to the aggregate volume of data that can be transmitted over a network like the Internet.

The basic concept of WDM is to insert and remove multiple data channels in and out of an optical fiber. Prior to the use of WDM, most optical fibers were used to unidirectionally carry only a single data channel at one wavelength. WDM divides a network's bandwidth into channels, with each channel assigned a particular wavelength. This allows multiple channels (each at a different wavelength) to be carried on the same transmission medium simultaneously. Each data channel is transmitted at a unique wavelength, and the wavelengths are appropriately selected such that the channels do not interfere with each other, and the optical transmission losses of the fiber are low. The gain in the network bandwidth is given by the aggregation of multiple single channel bandwidths.

The channels in a WDM system are multiplexed at a transmitting end and transmitted to a receiving end where they are demultiplexed into individual channels. In the existing systems, the transmitting and receiving ends must be tuned to the same wavelengths to be able to communicate. That is, the transmitting and receiving ends use a device such as an add/drop multiplexer to transmit/receive a fixed wavelength channel.

In the case of fiber optic cable, optical add/drop multiplexers are used at the transmitting and receiving ends to combine and separate multiple channels. The transmitting end combines all the channels into a single fiber using a multiplexer. At the receiving end the channels are separated with a demultiplexer. However, if not all of the channels carried by the fiber are required at the receiving end (or an intermediate node), a single drop filter can be used in place of a demultiplexer to extract an individual channel. Existing systems can have as many as 160 signal channels from which to choose.

A limitation in current drop filter implementations is their fixed wavelength response (i.e. the drop filter is configured to extract only a specific wavelength from the optical fiber).

SUMMARY OF THE INVENTION

The embodiments of the present invention are a method and an apparatus for a rotating, tunable, holographic drop filter in the field of fiber optics. According to several embodiments of the present invention, this drop filter uses a quasi phase-conjugate optical system for drop-channel fiber coupling. Multiple wavelength division multiplexed (WDM) channels are introduced to the system. The light from these channels is collimated by an input collimator and passed through a volume phase hologram so that only one WDM channel is diffracted and the rest of the WDM channels pass through the holographic material unaffected. The channel that is diffracted depends on the orientation of the rotatable holographic material.

According to one embodiment of the present invention, by rotating the holographic material, the system is tuned so that different wavelengths are diffracted and dropped at different times, using the same filter. This improves upon the fixed filter systems of the prior art.

A quasi phase-conjugate diffracted beam is generated by the optical system comprising of a lens and mirror combination. This beam is generated in order to couple the diffracted channel back into the fiber. The lens chosen is such that its focal length, combined with the mirror position, causes the diffracted light to retrace its path towards the holographic material regardless of the orientation of the holographic material and the incident light beam.

The re-incident light beam is Bragg matched to the holographic material so that it is diffracted along a path identical to the original incident light beam. A free-space circulator may be used to direct the diffracted light beam to a "drop" fiber, which is different from the fiber optic source of the incident light beam.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The embodiments of the present invention are a method and an apparatus for a rotating, tunable, holographic drop filter in the field of fiber optics. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

Figure 1:
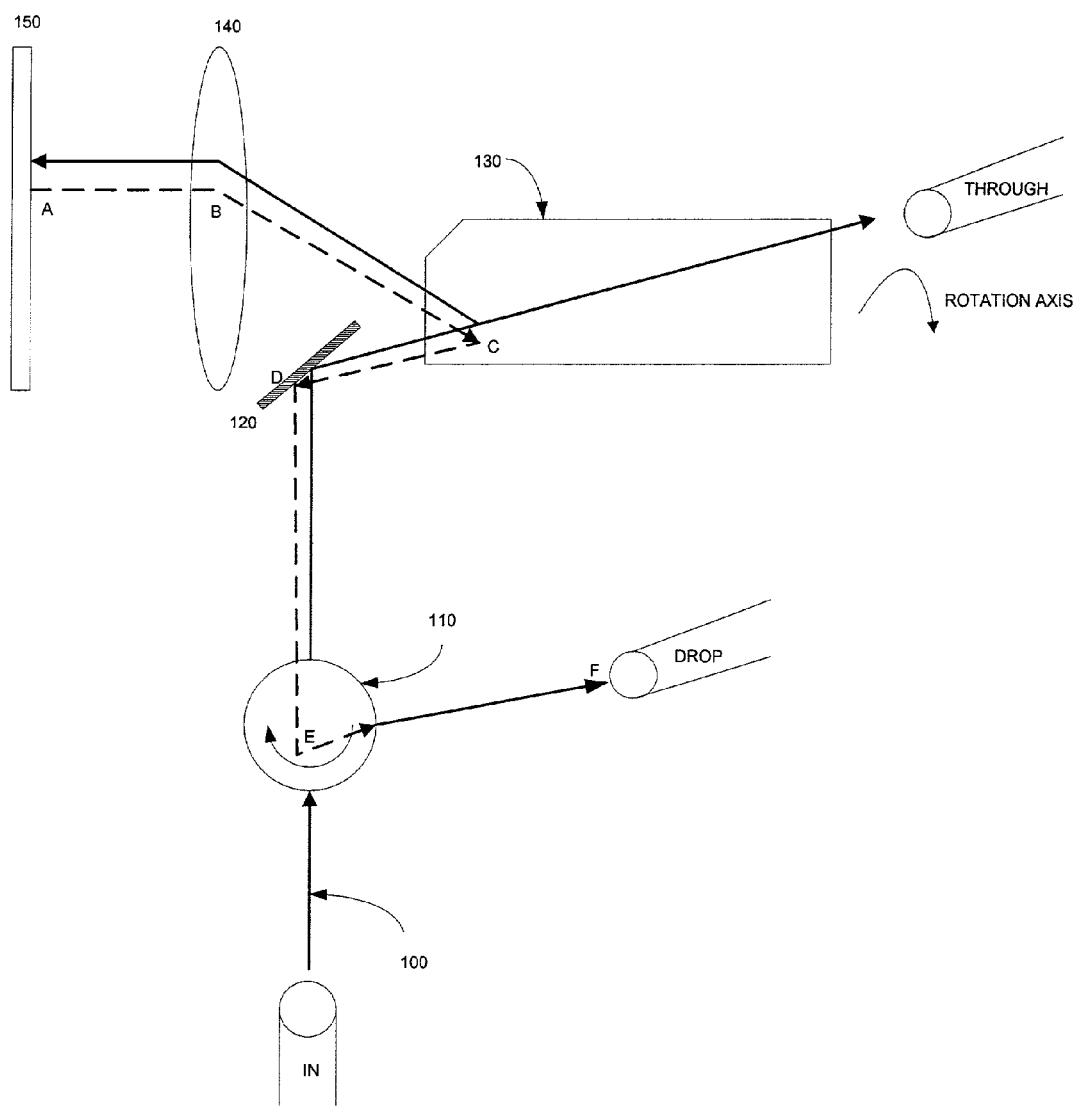
FIG. 1 illustrates the setup of the different components of the present invention.

FIG. 1 illustrates the operation of the present invention in its entirety, where fiber optic collimator 100 introduces several WDM channels of light as the input to the system. The fiber optic collimator 100 is marked "In" in the Figure. The light from these WDM channels passes through a free-space circulator 110 before being reflected off of mirror 120. The light enters a holographic material 130 after reflecting off of mirror 120. Holographic material 130 is designed so that only one of the wavelengths is diffracted, depending on the orientation of the holographic material. The rest of the WDM channels of light pass through holographic material 130 unaffected and exit through the fiber optic collimator marked "Through".

The diffracted WDM channel of light is then made to pass through lens 140 and bounced off mirror 150. The focal length of the lens 140 is chosen such that the diffracted and reflected light is Bragg matched to holographic material 130 irrespective of its orientation to the holographic material. The re-incident diffracted channel of light is diffracted along a path identical to the original incident beam but in the opposite direction. The path marked ABCDEF is a representation of the path taken by the re-incident diffracted WDM channel of light.

This re-incident diffracted WDM channel of light re-enters holographic material 130 before bouncing off mirror 120 and entering free-pace circulator 110. Free-space circulator 110 re-directs the WDM channel of light down a fiber optic collimator marked "Drop" in the figure, which is different from the fiber optic collimator marked "In". Using this system, one WDM channel of light can be separated without affecting the rest of the WDM channels that pass through the holographic material.

Rotating Tunable Holographic Drop Filter

The present invention uses a rotating tunable holographic drop filter. In one embodiment, the filter takes as input light from a fiber optic collimator. According to another embodiment of the present invention, the light first passes through a free-space circulator (FIG. 1, item 110). The free-space circulator is used in applications where a particular channel needs to be diverted to a fiber optic collimator different from the input collimator.

According to one embodiment of the present invention, the recorded hologram is rotated around an axis shown as a dotted line in FIG. 1, and marked rotation axis. It should be noted here that the direction of movement of the holographic material need not be circular as shown in FIG. 1, but rather could be of any shape. The tunability of the drop filter is achieved by changing the effective period length $\Lambda$ by changing the rotational orientation of the grating of the holographic material. As this rotational orientation changes, the light travels in a different direction with regard to the holographic structure stored in the holographic material. For incidence perpendicular to the fringes of the holographic grating, a small period length is present and small wavelengths are diffracted. In contrast, for non-perpendicular incidences, the effective period length of the gratings is increased and hence light of larger wavelengths is diffracted.

An alternative embodiment allowing tuning uses the hologram explained in co-pending U.S. patent application "Tunable Holographic Filter", application Ser. No. 09/823,173, filed on Mar. 29, 2001, and assigned to the assignee of this patent application. Any number of different materials may be used, including but not limited to, electro-optic crystals and electro-optic polymers. The material has a hologram formed thereon as a fixed reflection grating, with a length and orientation. The holographic material may be formed of any material where the reflective index can be varied in a periodic manner. For example, this may include electro-optic polymers, liquid-crystal dispersed polymers, and electro-optic oxide crystals such as lithium niobate, barium titanate potassium niobate, strontium-barium niobate mixed, and mixed potassium-titanate niobate crystals. In general, any material which can be used to make a hologram, and which has a variable refractive index, can be used.

The refractive index of the crystal may be changed by an external electric field. The refractive index may vary, for example, between 1.35 and 1.45. By varying the refractive index, the effective length, and hence the Bragg wavelength, can be changed. The formula given by $\lambda = 2 n \Lambda$ applies, where n is the averaged refractive index of the holographic material and $\Lambda$ is the length between two fringes of the hologram grating measured along a line that is parallel to the propagation direction of the light from the WDM channels. By tuning the refractive index n, the wavelength of the diffracted light $\lambda$ is correspondingly tuned. In this way, a certain channel is diffracted based on its wavelength, while other optical information is allowed to pass.

Holographic Material and Optical System

Figure 2:
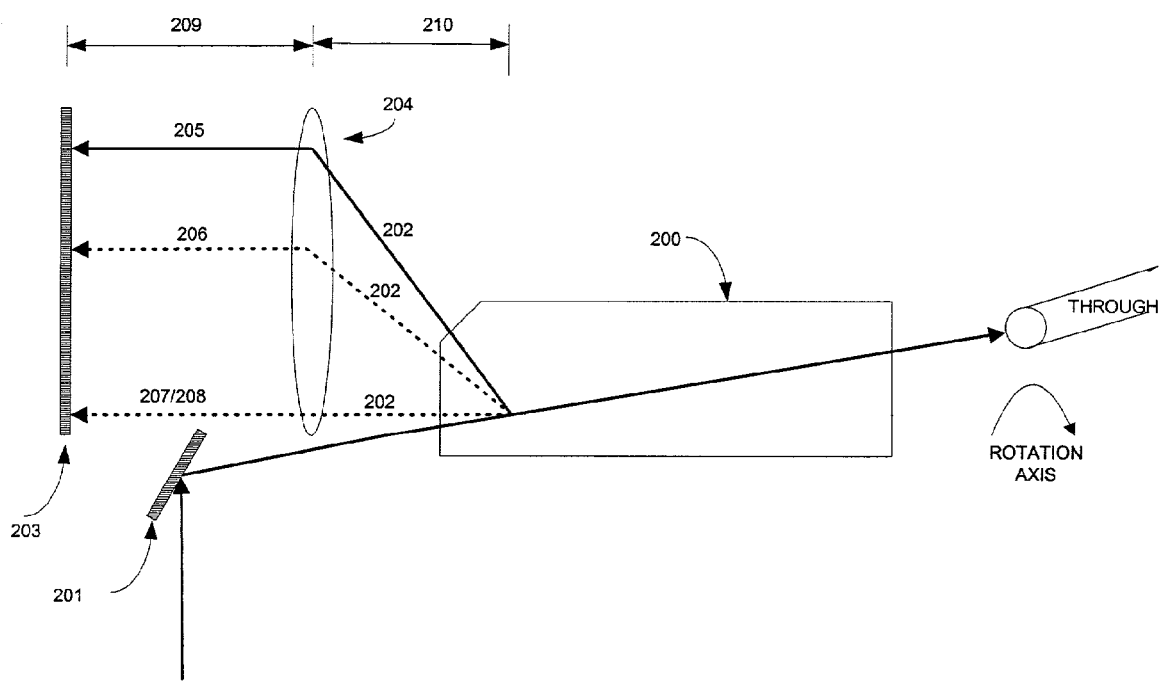
FIG. 2 illustrates one or more embodiments of the present invention.

FIG. 2 illustrates a more detailed view of the rotating hologram, where 200 is the holographic material through which the light from the collimator is directed. Mirror 201 is used to direct the light to pass through the holographic material 200 as explained with regard to FIG. 1. The path marked "Through" is the optical fiber collimator that all but the light from one WDM channel reaches after passing through the holographic material 200. The light from the single WDM channel 202 that is diffracted by the holographic material 200 goes through a quasi phase-conjugate optical system.

The diffracted light is made to pass through a lens and mirror combination. Depending on the orientation of the holographic material to the propagation vector of the incident light, there can be a variety of diffraction paths. In order to couple the diffracted light back into the fiber collimator, a quasi phase-conjugate diffracted beam is generated by the optical system.

In the configuration shown in FIG. 2, 203 is the mirror and 204 is the lens used in the optical system. The figure also shows four example diffraction paths that the light from the holographic material 200 can take, depending on the orientation of the holographic material 200 with respect to its rotation axis. These paths are labeled 205 through 208. Path 205 is taken when the angle of orientation is at 0°. Paths 207 and 208 are taken when the diffraction is at +/−90° respectively. Path 206 is one taken when the angle is between 0 and 90 degrees. The focal length, marked 209 and 210 in the figure, of the lens is chosen such that the diffracted light retraces its path towards the holographic material 200 regardless of the orientation of holographic material 200.

Diffracted Light

The re-incident diffracted light is Bragg matched to the holographic material such that it is diffracted along a path identical to the original incident beam. The free-space circulator explained above can then be used to divert this backward travelling beam to a fiber optic collimator different from the input collimator.

Hologaphic Material

The holographic material may be, for example, a photorefractive crystal. The hologram that is formed may be a grating in that holographic material or crystal. The light from the WDM channels is diffracted only if the Bragg matching condition is satisfied. The light wavelength $\lambda$ must fulfill the relation $\lambda=2$ n $\Lambda$.

Thus, a method and apparatus for a rotating, tunable, holographic drop filter in the field of fiber optics is described in conjunction with one or more specific embodiments. The embodiments of the present invention are defined by the following claims and their full scope of equivalents.

We claim:

1. A filter system comprising:
    a first fiber optic collimator;
    a free space circulator coupled to said first fiber optic collimator;
    a first mirror coupled to said free space circulator;
    a holographic drop filter coupled to said first mirror to diffract at least one of a plurality of WDM channels to an optical system and pass through a remainder of said plurality of WDM channels;
    said optical system further comprising a lens and a second mirror coupled to each other;
    said optical system coupled to said holographic drop filter redirects said at least one of said plurality of WDM channels back into said holographic drop filter;
    a second fiber optic collimator coupled to said holographic drop filter that collects said remainder of said plurality of WDM channels that pass through said holographic drop filter; and
    a third fiber optic collimator coupled to said free space circulator that collects said one of plurality of WDM channels redirected into said holographic drop filter by said optical system.

2. The filter system of claim 1 wherein said holographic drop filter is tunable.

3. The filter system of claim 2 wherein said filter system is tuned by rotating said holographic drop filter such that its effective period length is altered.

4. The filter system of claim 1 wherein diffraction of said at least one of said plurality of WDM channels to said optical system depends on said holographic drop filter's orientation.

5. The filter system of claim 4 wherein said second mirror is positioned at a focal length of said lens such that said quasi phase-conjugate diffracted channel is in a direction opposite to said one of plurality of WDM channels diffracted to said optical system.

6. The filter system of claim 4 wherein said holographic drop filter has a refractive index that can be altered by an external electric field.

7. The filter system of claim 6 wherein said refractive index is between 1.35 and 1.45.

8. The filter system of claim 4 wherein said holographic drop filter is made from a photorefractive crystal.

9. A method to tune a filter comprising the steps of:
    collimating a plurality of WDM channels by a first fiber optic collimator;
    coupling a free space circulator to said first fiber optic collimator;
    coupling a first mirror to said free space circulator;
    diffracting to an optical system coupled to said holographic drop filter one of said plurality of WDM channels by a holographic drop filter coupled to said first mirror; passing through said holographic drop filter rest of said plurality of WDM channels; redirecting one of plurality of WDM channels back into said holographic drop filter by said optical system;
    coupling a second fiber optic collimator to said holographic drop filter to collect rest of said plurality of WDM channels that pass through said holographic drop filter; and coupling a third fiber optic collimator to said free space circulator to collect said one of plurality of WDM channels redirected into said holographic drop filter by said optical system.

10. The method of claim 9 further comprising tuning of said holographic drop filter.

11. The method of claim 9 wherein tuning of said filter system is done by rotating said holographic drop filter such that its effective period length is altered.

12. The method of claim 9 wherein diffracting to said optical system one of said plurality of WDM channels depends on said holographic drop filter's orientation.

* * * * *